ent invention. This is true generally in the

UNITED STATES PATENT OFFICE.

RUDOLF LINKMEYER, OF BREMEN, GERMANY.

PROCESS OF MANUFACTURING MASSES FOR USE IN MAKING ARTIFICIAL THREADS AND THE LIKE.

979,013.

Specification of Letters Patent. Patented Dec. 20, 1910.

No Drawing.

Application filed March 29, 1909. Serial No. 486,572.

*To all whom it may concern:*

Be it known that I, RUDOLF LINKMEYER, a subject of the German Emperor, and resident at Bremen, Germany, have invented a new and useful Improved Process of Manufacturing Masses for Use in Making Artificial Threads and the Like, of which the following is a specification.

The subject-matter of my invention is an improved process of manufacturing dissolved masses for use in making artificial threads or filaments.

In a former application Serial Number 482,001, filed March 8, 1909, I have described a process, on which my present process is an improvement. Namely, according to the older process pure cellulose is dissolved to which, after it has been dissolved, are added other carbohydrates such as sugar, gliadin or various kinds of gums.

Now I have found that solutions having the same valuable properties as those obtained by the process above referred to can be made by such materials being employed for the solution which contains both cellulose and carbo-hydrates. I have also found that the vegetable parts, which if possible contain no pigments or coloring matters and as few kinds of albumen as possible, are most suited for the process according to my present invention. This is true generally in the case of plants about one year old or the new growth of trees. These young parts of plants contain, as is known from various publications, besides already formed cellulose much hemi-cellulose in addition and other carbohydrates such as kinds of gums and the like. The best results were obtained with rice hulls such as are obtained as a waste product when rice is hulled. I have found, further, that by treatment with chemical reagents, e. g. by boiling and bleaching, that part of the extraction material which is not bound so firmly with the raw fiber is removed, whereas a large part of the same, namely the portion which is more valuable for the later products, remains bound to the fiber, but is dissolved with the cellulose when the solution is being made and is separated out again in the filaments or threads.

An example for carrying the invention into practice will now be given: Rice hulls, for example, are boiled down from 12 to 18 hours with an addition of a small amount of alkalies or with an alkaline carbonate the same are then bleached white and without destroying the carbohydrates and then well washed. The hulls prepared in this manner are then placed into cupro-ammonium solution, as described in my previously mentioned former application, for the purpose of dissolving them which is effected completely after a short time. The solution thus obtained has the same property as those made according to my former application above referred to. The commercial value of these hulls which were hardly used at all heretofore is so small that it equals only the fortieth part of the value of raw cotton. This circumstance, and the fact that the solution has attached to it specially good properties for the manufacture of artificial threads or filaments, render the employment of this material specially advantageous and consequently characterize exceedingly important industrial progress in the branch of industry in question.

I claim:

1. The process for the manufacture of artificial threads of high gloss and great strength which comprises treating young plant parts containing hemi-cellulose and other carbohydrates with a solution of cupro-ammonium and forming threads from such solution while maintaining therein the hemi-cellulose and other carbohydrates.

2. The process of producing dissolved substances for making artificial threads of high gloss and great strength, which comprises cleaning and bleaching those young parts of plants or vegetable matter which contain in addition to cellulose a large percentage of other carbohydrates and hemi-cellulose while maintaining the carbohydrates, hemi-cellulose and cellulose intact and dissolving the plants or vegetables thus treated in solvents employed as reagents for pure cellulose to obtain a solution containing cellulose, hemi-cellulose and other carbohydrates.

3. The process of producing cellulose solutions which comprises treating vegetable matter containing cellulose, hemi-cellulose and carbohydrates with a weak alkaline solution insufficient to remove the carbohydrates, hemi-cellulose and cellulose, bleaching the product without destroying the carbohydrates, and finally dissolving the product in a cupro-ammonium solvent to obtain a solution containing cellulose, hemi-cellulose and carbohydrates.

In testimony whereof, I affix my signature in the presence of two witnesses.

RUDOLF LINKMEYER.

Witnesses:
FERDINAND REICH,
FREDERICK HAYERMAUR.